(12) United States Patent
Shukla

(10) Patent No.: US 10,367,893 B1
(45) Date of Patent: *Jul. 30, 2019

(54) METHOD AND APPARATUS OF PERFORMING PEER-TO-PEER COMMUNICATION ESTABLISHMENT

(71) Applicant: OPEN INVENTION NETWORK LLC, Durham, NC (US)

(72) Inventor: Anjini Shukla, Mountain View, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/410,285

(22) Filed: Jan. 19, 2017

Related U.S. Application Data

(63) Continuation of application No. 12/980,559, filed on Dec. 29, 2010, now Pat. No. 9,560,141.

(51) Int. Cl.
*H04L 29/06* (2006.01)
*H04L 29/08* (2006.01)

(52) U.S. Cl.
CPC ............ *H04L 67/141* (2013.01); *H04L 67/02* (2013.01); *H04L 67/146* (2013.01); *H04L 69/165* (2013.01)

(58) Field of Classification Search
CPC ..... H04L 67/14; H04L 67/104; H04L 67/141; H04L 67/1074; H04L 67/2804;
(Continued)

(56) References Cited

U.S. PATENT DOCUMENTS 6,157,944 A * 12/2000 Pedersen ................ G06F 9/542
709/204
6,370,561 B1 * 4/2002 Allard ..................... G06F 9/548
709/203
(Continued)

OTHER PUBLICATIONS

Sen S, Spatscheck O, Wang D. Accurate, scalable in-network identification of p2p traffic using application signatures. InProceedings of the 13th international conference on World Wide Web May 17, 2004 (pp. 512-521). ACM. (Year: 2004).*
(Continued)

*Primary Examiner* — Ranodhi Serrao
*Assistant Examiner* — James N Fiorillo

(57) ABSTRACT

A method and apparatus of establishing a network connection for P2P communications is disclosed. According to one example, a method of establishing a network connection may include establishing an initial data connection between a first network device and a second network device via a third network device, the third network device providing an initial communication channel required to exchange setup messaging between the first network device and the second network device. Other operations may include establishing another data connection between the first network device and the second device after the setup messaging is exchanged, the another connection being independent of the third network device, and transferring data messages between the first network device and the second network device via the another connection. Once the P2P connection is established, the initial data connection may be removed.

20 Claims, 5 Drawing Sheets

(58) Field of Classification Search
CPC ......... H04L 69/14; H04L 69/16; H04L 69/40;
H04L 69/321; H04L 69/1206; H04L
29/12028; H04L 29/06; H04L 12/00
USPC ........ 709/203, 224, 225, 227, 228, 229, 235
See application file for complete search history.

(56) References Cited

U.S. PATENT DOCUMENTS

| | | | | | |
|---|---|---|---|---|---|
| 7,797,429 | B2* | 9/2010 | Liang | ................ | H04L 29/12377 370/422 |
| 8,966,112 | B1* | 2/2015 | Franke | ................ | H04L 69/321 370/229 |
| 2002/0147810 | A1* | 10/2002 | Traversat | .............. | G06F 9/4416 709/224 |
| 2004/0044727 | A1* | 3/2004 | Abdelaziz | ........... | H04L 61/3065 709/203 |
| 2004/0139228 | A1* | 7/2004 | Takeda | ............. | H04L 29/12066 709/245 |
| 2004/0162871 | A1* | 8/2004 | Pabla | ................... | H04W 8/005 709/201 |
| 2005/0120082 | A1* | 6/2005 | Hesselink | ........... | H04L 63/0272 709/203 |
| 2005/0144288 | A1* | 6/2005 | Liao | ....................... | H04L 29/06 709/227 |
| 2005/0233737 | A1* | 10/2005 | Lin | ........................ | H04L 51/04 455/416 |
| 2006/0095570 | A1* | 5/2006 | O'Sullivan | ......... | H04L 41/0631 709/224 |
| 2007/0112962 | A1* | 5/2007 | Lewontin | ................ | H04L 69/16 709/227 |
| 2008/0244076 | A1* | 10/2008 | Shah | ....................... | H04W 4/02 709/227 |
| 2009/0059788 | A1* | 3/2009 | Granovsky | ............. | H04L 47/10 370/235 |
| 2009/0325570 | A1* | 12/2009 | Rensin | ............. | H04L 29/06027 455/422.1 |
| 2010/0005171 | A1* | 1/2010 | Arolovitch | .......... | H04L 65/4084 709/225 |
| 2010/0146085 | A1* | 6/2010 | Van Wie | ................. | H04L 12/00 709/220 |
| 2010/0322137 | A1* | 12/2010 | LoGalbo | ............. | H04L 65/4046 370/312 |
| 2011/0093600 | A1* | 4/2011 | Lee | ........................ | H04W 48/18 709/228 |
| 2011/0153718 | A1* | 6/2011 | Dham | ................. | H04L 12/2834 709/203 |
| 2011/0276698 | A1* | 11/2011 | Bigioi | ................ | H04N 1/00145 709/227 |
| 2011/0277018 | A1* | 11/2011 | Weizman | .......... | H04L 29/12028 726/4 |
| 2011/0289221 | A1* | 11/2011 | Lowekamp | ............. | H04L 69/40 709/227 |
| 2011/0296051 | A1* | 12/2011 | Vange | .................... | H04L 41/12 709/238 |
| 2012/0166656 | A1* | 6/2012 | Asveren | ................ | H04L 63/029 709/228 |
| 2012/0179829 | A1* | 7/2012 | George | ............... | H04L 61/2564 709/227 |
| 2012/0259988 | A1* | 10/2012 | Erringer | ................ | H04L 67/104 709/228 |
| 2014/0164640 | A1* | 6/2014 | Ye | ........................... | H04L 47/12 709/235 |

OTHER PUBLICATIONS

U Liu et al. "TCPBridge: A Software Approach to Establish Direct Communications for NAT" (IEEE/ACS International Conference—Computer Systems and Applications—Mar. 31-Apr. 4, 2008) pp. 247-252. (Year: 2008).*

Harjula E, Ylianttila M, Ala-Kurikka J, Riekki J, Sauvola J. Plug-and-play application platform: towards mobile peer-to-peer. InProceedings of the 3rd international conference on Mobile and ubiquitous multimedia Oct. 27, 2004 (pp. 63-69). ACM. (Year: 2004).*

Leiner BM, Cerf VG, Clark DD, Kahn RE, Kleinrock L, Lynch DC, Postel J, Roberts LG, Wolff S. A brief history of the Internet. ACM SIGCOMM Computer Communication Review. Oct. 7, 2009;39(5):22-31. (Year: 2009).*

* cited by examiner

METHOD AND APPARATUS OF PERFORMING PEER-TO-PEER COMMUNICATION ESTABLISHMENT

CROSS-REFERENCE TO RELATED APPLICATIONS

This application is a continuation of U.S. application Ser. No. 12/980,559 filed Dec. 29, 2010 entitled "METHOD AND APPARATUS OF PERFORMING PEER-TO-PEER COMMUNICATION ESTABLISHMENT", now issued U.S. Pat. No. 9,560,141, issued Jan. 31, 2017, the entire contents is incorporated herein in its entirety.

TECHNICAL FIELD OF THE INVENTION

This invention relates to a method and apparatus of establishing data communications in a peer-to-peer communication environment by implementing a user datagram protocol data transfer (UDT) protocol along with a transmission control protocol (TCP).

BACKGROUND OF THE INVENTION

Automated UDT is defined as a UDP-based data transfer. UDT is typically built on top of UDP by adding reliability control and congestion control. UDT may be used to provide a high performance transfer interface to distributed data-intensive applications over a wide area network. In instances where TCP seldom operates efficiently, UDT may provide an alternative to data transfer. UDT can also be used in other situations where TCP is not suitable (e.g., multimedia streaming, firewall data transfers, partial reliability, etc.).

The flow of data traffic within communications networks is predominantly based on the proprietary transmission control protocol (TCP). UDT data flows can share the available bandwidth fairly, while accommodating TCP data traffic. UDT operates at the application level. UDT supports user-defined congestion control algorithms with simple setup configuration. Users may modify UDT to suit various situations. UDT is based on the user datagram protocol (UDP), which makes it easier to traverse data firewalls. In addition, multiple UDT flows can share a single UDP port, which is advantageous since a firewall can usually only open one UDP port for all UDT connections present.

As indicated above, implementing the UDT protocol can increase data communication efficiency in certain circumstances, however, integration with UDT and proprietary TCP communication networking protocols presents challenges when implementing such hybrid protocol suites.

SUMMARY OF THE INVENTION

One embodiment of the present invention may include a method of establishing a network connection. The method may include establishing an initial data connection between a first network device and a second network device via a third network device. The method may further include the third network device providing an initial communication channel required to exchange setup messaging between the first network device and the second network device. The method may also include establishing another data connection between the first network device and the second device after the setup messaging is exchanged, the another connection being independent of the third network device. The method may also include transferring data messages between the first network device and the second network device via the another connection.

Another example embodiment of the present invention may include an apparatus configured to establish a network connection. The apparatus may include a processor configured to establish an initial data connection to a second network device via a third network device, the third network device providing an initial communication channel required to exchange setup messaging to the second network device, and establish another data connection to the second device after the setup messaging is exchanged, the another connection being independent of the third network device. The apparatus may also include a transmitter configured to transfer data messages to the second network device via the another connection.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
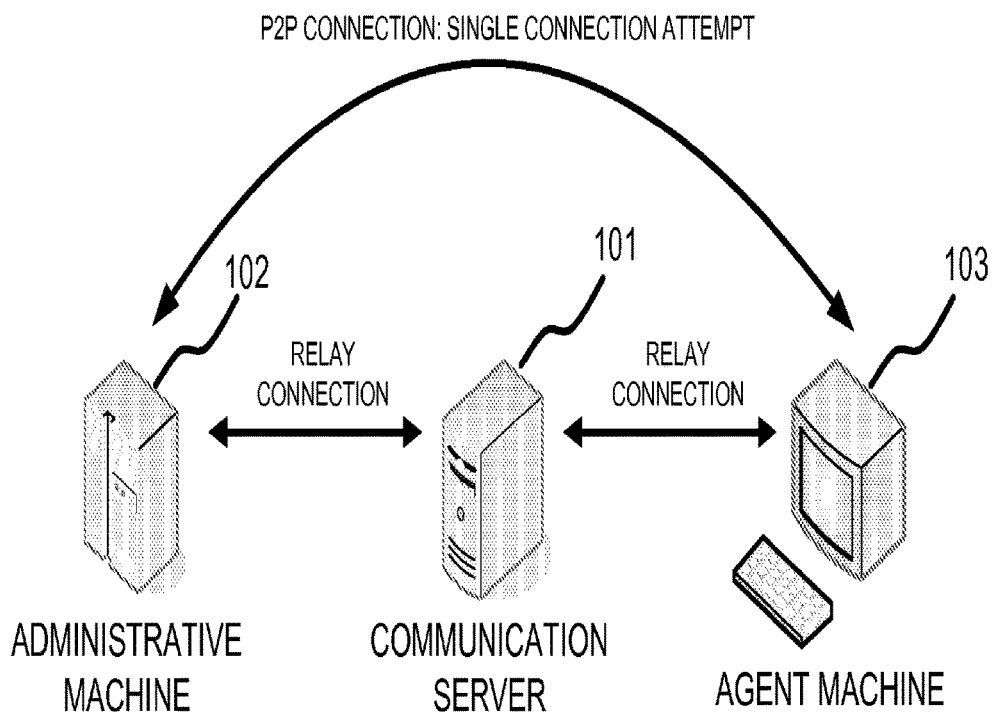
FIG. 1 illustrates an example network configuration, according to conventional configurations of the prior art.

FIG. 1 illustrates an example conventional communication network. Referring to FIG. 1, a communication server 101 is in communication with an administrative machine 102, which may be any of the computers or computing devices operating on the communication network. The communication network also includes an agent machine 103. Although, the physical configuration of FIG. 1 may also be similar to example embodiments of the present invention, the communication protocol signaling, connection establishment messages and/or other communication features follow conventional operations, which are different from the communication signaling of the present invention.

Figure 2:
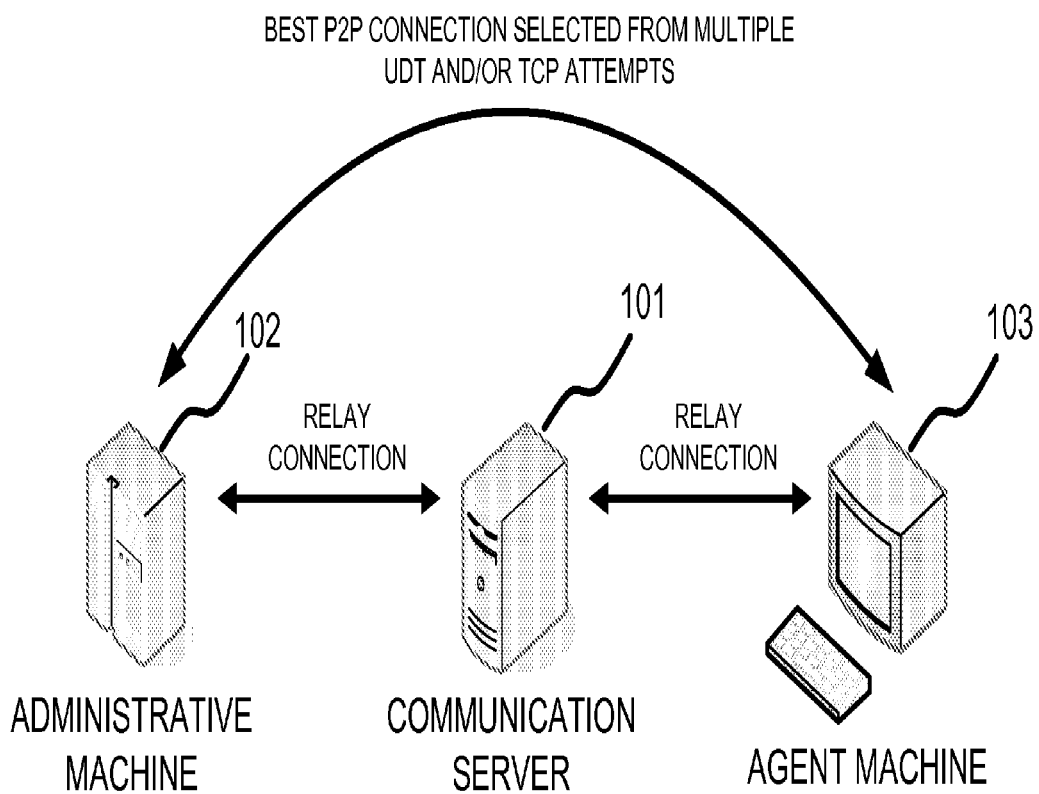
FIG. 2 illustrates an example network configuration, according to example embodiments of the present invention.

FIG. 2 illustrates an example communication network, according to example embodiments of the present invention. Referring to FIG. 2, a communication server 101 is in communication with an administrative machine 102, which may be any of the computers or computing devices operating on the communication network. The communication network also includes an agent machine 103.

Figure 3:
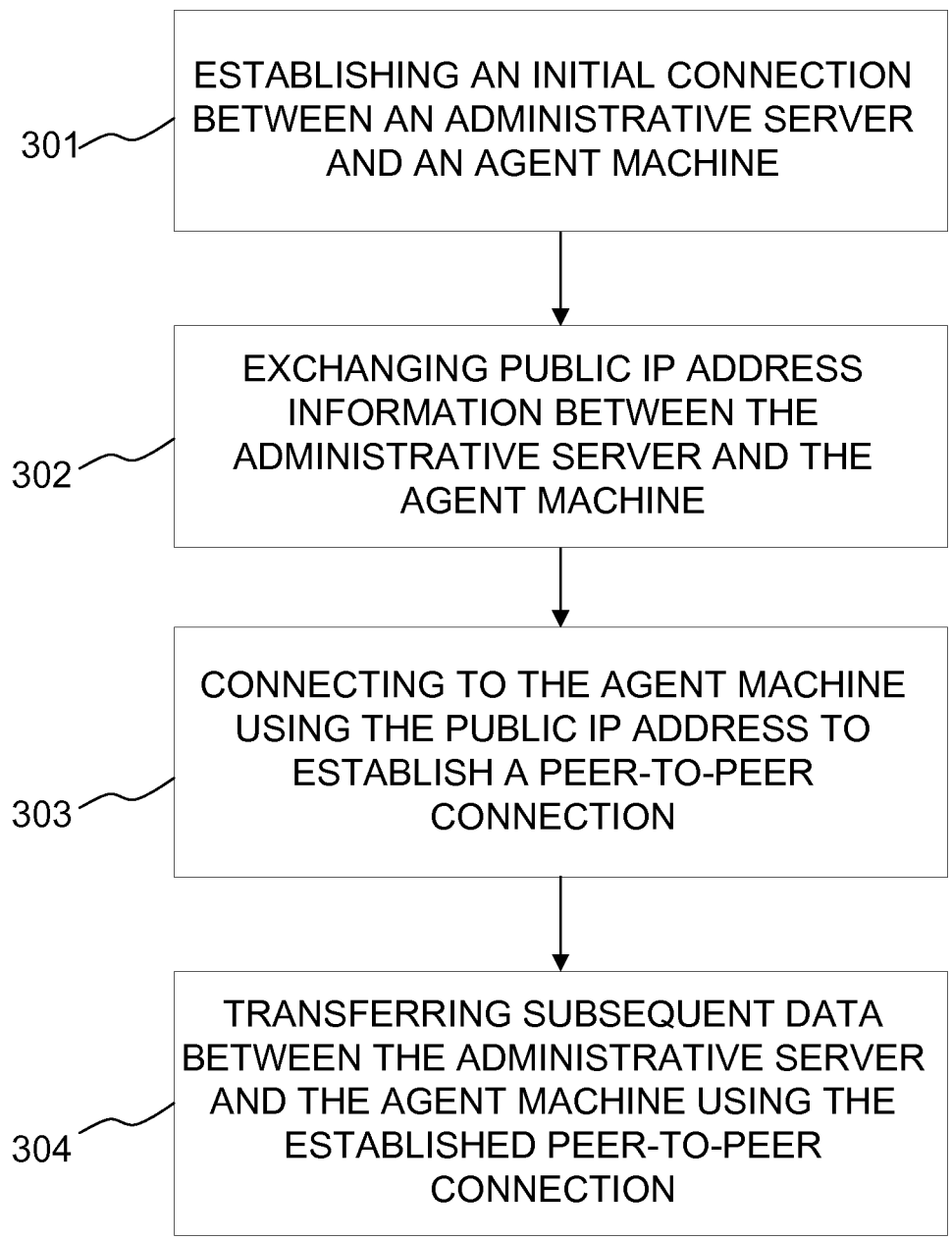
FIG. 3 illustrates an example flow diagram, according to an example method of operation of the present invention.

FIG. 3 illustrates an example method of operation according to example embodiments of the present invention. Referring to FIGS. 2 and 3, in operation, an initial connection is established between an administrative machine 102 and the agent machine 103 (see operation 301) via the communication server 101. The communication server 101 may provide a connection between the administrative server 102 and the agent machine 103 by providing an initial communication channel required to exchange messages used to establish a P2P connection via rendezvous messages. Also, a live connect feature of the communication server 101 that becomes fully connected and fully functional may reduce the wait time observed from the user perspective.

In operation, the administrative machine 102 performs a HTTP request to the communication server 101 from a browser interface to connect to the agent machine 103. The HTTP request contains a session-ID uniquely identifying the session and an agent globally unique identifier (GUID) uniquely identifying the agent. In response to the request, the communication server 101 executes a "startKLC" script on the specified agent machine 103. The agent machine 103 executes the script to download all necessary dynamic linked libraries (DLLs) from the communication server 101, and begins listening on a specific port for incoming TCP connections. The agent machine 103 then responds to the communication server 101 by reporting which port (port number) it is listening to on the communication server 101. The same port may be used to establish a TCP connection.

The connection may be setup by running a script that performs a series of operations. For example, a script may include downloading the necessary DLLS that may be used to establish the connection, and executing the commands that use these DLLS to establish the connection. Once the initial connection is established, the administrative server 102 and the agent machine 103 may exchange IP addresses by using rendezvous messages, which may be used to establish a P2P connection. Additionally, it is necessary for a connecting machine to have access to the public IP address of the remote machine seeking access. A public IP address is a unique IP address that can be used to connect to the remote machine outside its private network.

The administrative machine 102 discovers its own public IP address by querying a stun server, then encapsulates its address into a rendezvous message and sends it to the agent machine 103. The agent machine 103 reads the rendezvous message and tries to establish a connection with the IP address specified in the message. Since this IP address is a public IP address, agent machine 103 has network access to the address and is capable of reaching it and connecting to it. The above-mentioned operations are symmetrical, and similar or identical operations occur on the agent machine 103. For example, agent machine 103 may attempt to discover its own public IP address, and send it to the administrative machine 102 as a rendezvous message (see operation 302). The IP addresses are exchanged through the communication server 101 to the agent machine 103 and the administrative server 102. The administrative server 102 may then attempt to connect to the agent machine 103 via a public IP address to establish a peer-to-peer connection (see operation 303). In connecting the agent machine 103 with the administrative server 102, the administrative server 102 may use the IP address it received as part of the rendezvous message exchange between the agent machine 103 and the administrative server 102.

Once a peer-to-peer connection is established, all data is transferred between the agent machine 103 and the administrative machine via the peer-to-peer connection (see operation 304). In other words, the initial relay connection used to share IP address information (rendezvous messages) is no longer used. The initial relay connection is a TCP connection between the administrative machine 102 and the agent machine 103 via the communication server 101. The P2P connection may provide increased scalability since the data is now exchanged directly between the administrative machine 102 and agent machine 103 and no longer requires the communication server 101 to send and receive messages.

In general, one communication server 101 may serve as a communication medium for thousands of agents without experiencing overloading. In addition, since the connection is dedicated only for the exchange of data between the agent machine 103 and the administrative machine 102 there is an increased likelihood that the P2P connection will provide a more secure and efficient data connection than the relay connection provided via the communication server 101. Another outcome of the established P2P connection is data optimization. For instance, once all possible connections speed and reliability have been measured, the most optimal connection may be selected as the best connection among the P2P connection. It is important to note that there can be more than one P2P connection and relay connection.

The agent machine 103 may be operating under a software agent compatible with the communication server 101. The administrative server 102 may be any network machine that the administrator logs into as a virtual system administrator and manages the machines that are being monitored, such as, a monitored agent machine 103.

Figure 4:
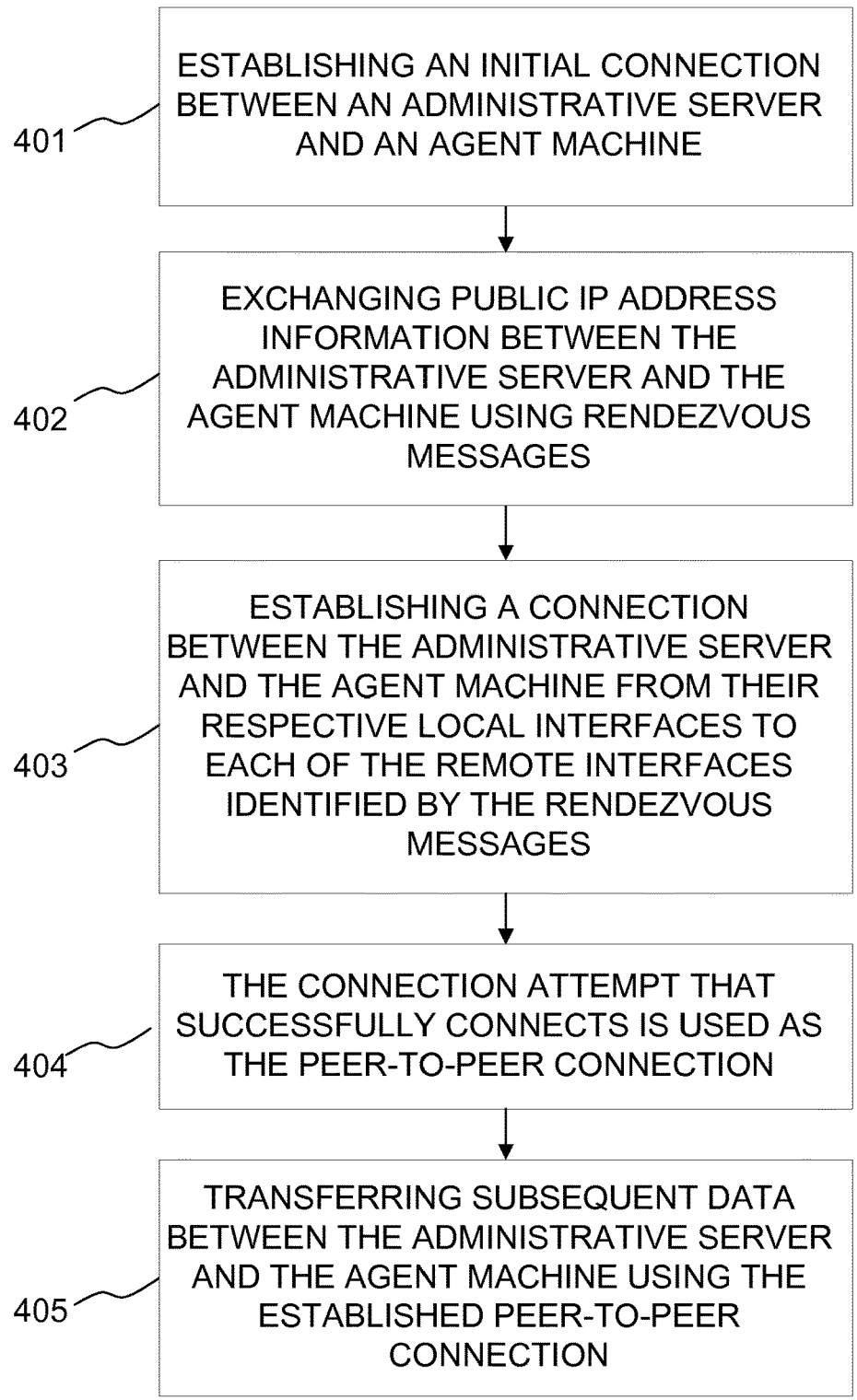
FIG. 4 illustrates another example flow diagram, according to an example method of operation of the present invention.

According to other example embodiments of the present invention, a peer-to-peer connection may be established using a hybrid TCP/UDT approach, as illustrated in the flow diagram of FIG. 4. In operation, an initial connection is established between the administrative server 102 and the agent machine 103 (see operation 401). The communication server 101 may provide a connection between the administrative server 102 and the agent machine 103.

Once the initial connection is established, the administrative server 102 and the agent machine 103 may exchange IP addresses by using rendezvous messages (see operation 402). The IP addresses may be exchanged directly between the agent machine 103 and the administrative server 102, or, alternatively, may be exchanged through the third party communication server 101 to the agent machine 103 and the administrative server 102. The administrative server 102 may then attempt to connect to the agent machine 103, using each of the local interfaces. For instance, one machine may have one or more network interface cards (i.e., interfaces).

An attempt may be made to connect to one or more of the available interfaces to transmit establishment requests to every remote interface identified from the reception of the rendezvous message (see operation 403). For example, local interfaces of the agent machine 103 (1, 2) (not shown) may transmit a connect message to each of the remote interfaces (A, B, C) (not shown) of the administrative machine 102. The connection establishment may be symmetric, such that each of the remote interfaces attempts to connect to each of the local interfaces.

Every connection attempt may be performed on an independent thread using the TCP and UDT protocols. For example, each connection attempt for a TCP connection may be performed by establishing a connection attempt thread designated to attempt TCP connections over the communication network of FIG. 2. In connecting the agent machine 103 with the administrative server 102, the administrative server 102 may use the IP address it received as part of the rendezvous message exchange between the agent machine 103 and the administrative server 102. The first connection attempt that is deemed a successful connection may be used as the peer-to-peer connection between the administrative server 102 and the agent machine 103 (see operation 404). Once a peer-to-peer connection is established, all data is transferred between the agent machine 103 and the administrative machine via the peer-to-peer connection (see operation 405). In other words, the initial relay connection used to share information and setup the connection attempt is no longer used.

Alternatively, the most reliable and/or most efficient connection may be deemed the actual connection. Simultaneous connection attempts may be performed by a thread designated to attempt connections over UDT. The UDT connection attempts may be performed by executing threads that determine a "BestRouteFound." In general, the connection that is established first over the TCP and UDT attempts will be the selected connection, however, additional considerations may be made before selecting a connection, such as, reliability, history, predetermined preferences, etc.

When establishing a UDT connection, a machine, such as, an agent machine 103 sends a request to connect to a remote machine, such as, an administrative machine 102 or vice versa. The remote machine responds by sending an acknowledgement message. Once the initiator of the request receives the acknowledgement response, the UDT protocol operates by designating the connection to be connected. The agent machine 103 may send a UDT connection request to the administrative machine 102 by transmitting a connection request from each interface and vice versa. For example, if the agent machine 103 has two interfaces (1, 2) and the administrative machine 102 has three interfaces (A, B, C), then the combination of the various interfaces may yield 6 connection requests (2 agent interfaces×3 administrative interfaces), however, the result may yield fewer (i.e., one) connections then connection attempt messages transmitted.

After a P2P connection is established, a change over may be requested and confirmed via communication between the administrative machine 102, the communication server and/or the agent machine 103. For example, once the P2P establishment algorithm determines a new connection is more optimal than the one currently being used for data transfer a change-over may be performed to use the better connection for data transfer. It is a mutual agreement between the agent machine 103 and administrative machine 102 to use the new established connection for all communications.

In order to determine whether a change-over is appropriate the agent machine 103 monitors all the active connections and measures speed (bandwidth MHz) and reliability (number of errors and re-attempts). If a determination is made that a new connection would perform with increased optimization as compared to the current connection being used, a change-over decision may be made. Such a change-over may include sending a message to the administrative machine 102 that all subsequent communication will be performed on this new connection. In response, the administrative machine 102 sends a response to the agent machine 103 "OK" or "ACK" that it is acceptable to use the established connection. The response from the administrative machine 102 completes the change-over. After this response, all messages between the agent machine 103 and administrative machine 102 are exchanged on the new connection.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components 101, 102 and 103.

Figure 5:
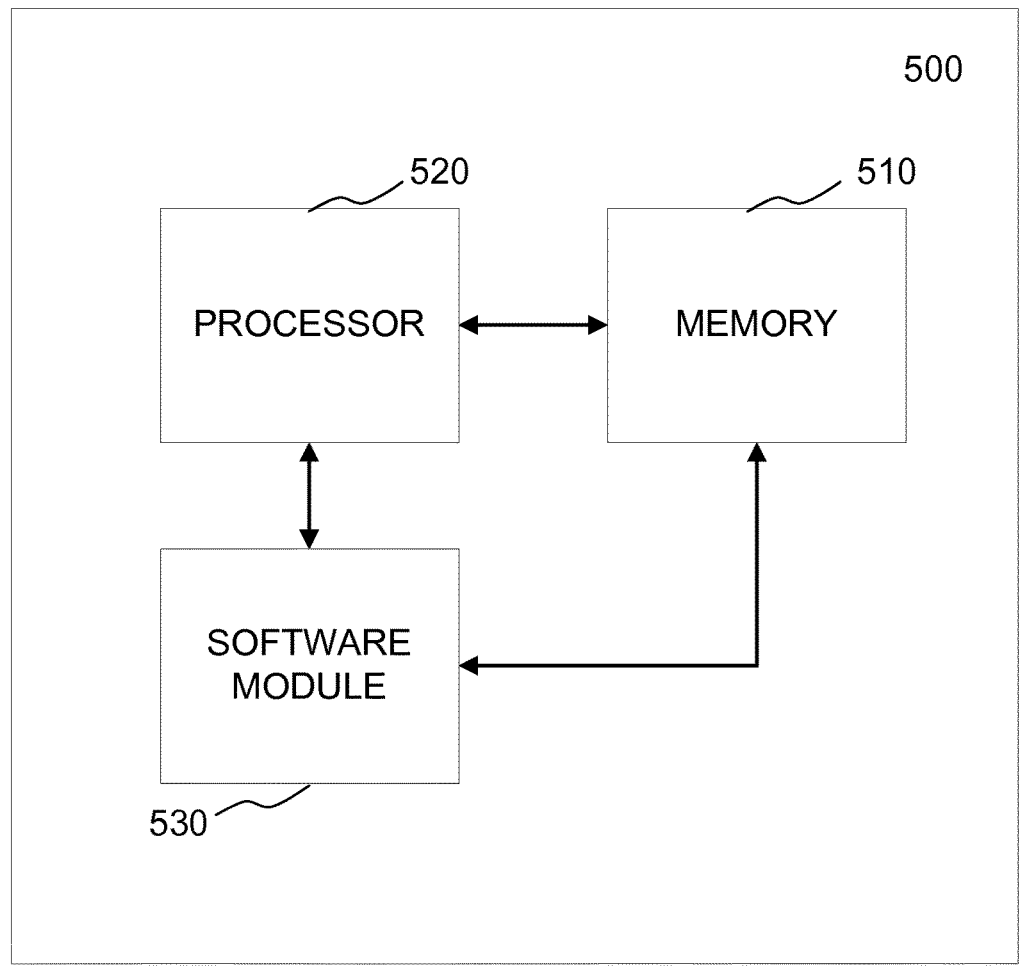
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
   establishing an initial TCP data connection between a first network device and a second network device via a third network device;
   transmitting, via the initial TCP data connection, a rendezvous message from the first network device to the third network device;
   sending, via the first network device, parallel TCP/user datagram protocol data transfer (UDT) connection messages to attempt a connection with each local interface of the third network device, based on information contained in the rendezvous message;
   identifying, via the first network device, an optimal connection based on performance information associated with each connection attempt;
   establishing a peer-to-peer (P2P) data connection between the first network device and the second device based on the identified optimal connection, the P2P data connection being independent of the third network device;
   transferring a request to the third network device over the initial TCP data connection to connect the first network device with the second network device via the P2P connection;
   responsive to receiving the request, listening on a specific port for incoming connection communications from the third network device and executing a script on the second network device via the third network device that performs downloading of dynamic linked libraries (DLLs) from the third network device to the second network device; and
   transferring data messages between the first network device and the second network device via the P2P connection.

2. The method of claim 1, wherein the third network device provides the initial communication channel used to share messages to establish the P2P connection between the first network device and the second network device.

3. The method of claim 1, further comprising:
   transmitting a different rendezvous message from the second network device to the third network device, the different rendezvous message comprising a public IP address identifying the second network device; and
   forwarding the different rendezvous message to the first network device.

4. The method of claim 1, wherein the rendezvous message comprises a public IP address identifying the first network device and wherein the third network device providing an initial communication channel required to exchange setup messaging between the first network device and the second network device.

5. The method of claim 1, wherein the request is a HTTP request, which comprises a globally unique identifier (GUID) uniquely identifying the second network device.

6. The method of claim 1, wherein the incoming connection communications are transmission control protocol (TCP) connections.

7. The method of claim 1, further comprising:
   transmitting a port number used for the listening to the third network device; and
   establishing a TCP or a user datagram protocol data transfer (UDT) connection on the port and transmitting data via the P2P connection.

8. An apparatus, comprising:
   a processor coupled to a memory device, wherein the processor:
   establishes an initial data connection to a second network device via a third network device;
   transmits, via the initial TCP data connection, a rendezvous message to the third network device;
   sends parallel TCP/user datagram protocol data transfer (UDT) connection messages to attempt a connection with each local interface of the third network device, based on information contained in the rendezvous message;
   identifies an optimal connection based on performance information associated with each connection attempt;
   establishes a peer-to-peer data (P2P) connection to the second device after the rendezvous message has been forwarded to the second network device based on the identified optimal connection, the peer-to-peer data connection being independent of the third network device via the P2P connection;
   transfers a request to the third network device over the initial TCP data connection to connect the first network device with the second network device;
   responsive to the request being received, listens on a specific port for incoming connection communications from the third network device and execute a script on the second network device via the third network device that downloads dynamic linked libraries (DLLs) from the third network device to the second network device; and
   a transmitter which transmits data messages to the second network device via the P2P connection.

9. The apparatus of claim 8, wherein the third network device provides the initial communication channel used to share messages to establish the P2P connection to the second network device.

10. The apparatus of claim 8, wherein the second network device transmits a different rendezvous message to the third network device, the different rendezvous message comprising a public IP address identifying the second network device, and
    forwards the different rendezvous message to the apparatus.

11. The apparatus of claim 8, wherein the processor transmits a rendezvous message to the third network device, the rendezvous message comprising a public IP address identifying the apparatus, and wherein the third network device providing an initial communication channel required to exchange setup messaging to the second network device.

12. The apparatus of claim 8, wherein the request is a HTTP request which comprises a globally unique identifier (GUID) uniquely identifying the second network device.

13. The apparatus of claim 8, wherein the processor is further configured to establish a TCP or a user datagram protocol data transfer (UDT) connection on the specific port, and the transmitter is configured to transmit data via the P2P connection.

14. A non-transitory computer readable storage medium configured to store instructions that when executed by a processor cause the processor to perform:
    establishing an initial TCP data connection between a first network device and a second network device via a third network device;
    transmitting, via the initial TCP data connection, a rendezvous message from the first network device to the third network device;
    sending, via the first network device, parallel TCP/user datagram protocol data transfer (UDT) connection messages to attempt a connection with each local interface of the third network device, based on information contained in the rendezvous message;

identifying, via the first network device, an optimal connection based on performance information associated with each connection attempt;

establishing a peer-to-peer (P2P) data connection between the first network device and the second device based on the identified optimal connection, the P2P data connection being independent of the third network device;

transferring a request to the third network device over the initial TCP data connection to connect the first network device with the second network device via the P2P connection;

responsive to receiving the request, listening on a specific port for incoming connection communications from the third network device and executing a script on the second network device via the third network device that performs downloading of dynamic linked libraries (DLLs) from the third network device to the second network device; and transferring data messages between the first network device and the second network device via the P2P connection.

15. The non-transitory computer readable storage medium of claim 14, wherein the third network device provides the initial communication channel used to share messages to establish the P2P connection between the first network device and the second network device.

16. The non-transitory computer readable storage medium of claim 14, further configured to store instructions that when executed by the processor cause the processor to perform:

transmitting a different rendezvous message from the second network device to the third network device, the different rendezvous message comprising a public IP address identifying the second network device; and forwarding the different rendezvous message to the first network device.

17. The non-transitory computer readable storage medium of claim 14, further configured to store instructions that when executed by the processor cause the processor to perform:

transmitting a rendezvous message from the first network device to the third network device, the rendezvous message comprising a public IP address identifying the first network device; and providing an initial communication channel required to exchange setup messaging between the first network device and the second network device.

18. The non-transitory computer readable storage medium of claim 14, wherein the request is a HTTP request which comprises a globally unique identifier (GUID) uniquely identifying the second network device.

19. The non-transitory computer readable storage medium of claim 18, wherein in response to the HTTP request, the incoming connection communications are transmission control protocol (TCP) connections.

20. The non-transitory computer readable storage medium of claim 14, further configured to store instructions that when executed by the processor cause the processor to perform:

transmitting a port number used for the listening to the third network device; and establishing a TCP or a user datagram protocol data transfer (UDT) connection on the port and transmitting data via the P2P connection.

* * * * *